United States Patent
Jiang et al.

(10) Patent No.: US 11,564,207 B2
(45) Date of Patent: Jan. 24, 2023

(54) METHODS AND APPARATUSES FOR UPLINK TRANSMISSION ON AN UNLICENSED SPECTRUM

(71) Applicant: NEC CORPORATION, Tokyo (JP)

(72) Inventors: Lei Jiang, Beijing (CN); Hongmei Liu, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/752,624

(22) PCT Filed: Feb. 2, 2016

(86) PCT No.: PCT/CN2016/073225
§ 371 (c)(1),
(2) Date: Feb. 14, 2018

(87) PCT Pub. No.: WO2017/132844
PCT Pub. Date: Aug. 10, 2017

(65) Prior Publication Data
US 2019/0037538 A1    Jan. 31, 2019

(51) Int. Cl.
H04W 72/04    (2009.01)
H04W 74/08    (2009.01)
H04W 16/14    (2009.01)

(52) U.S. Cl.
CPC ....... *H04W 72/04* (2013.01); *H04W 74/0808* (2013.01); *H04W 16/14* (2013.01)

(58) Field of Classification Search
CPC .. H04W 72/04; H04W 74/0808; H04W 16/14
See application file for complete search history.

(56) References Cited

U.S. PATENT DOCUMENTS

| | | | |
|---|---|---|---|
| 9,930,654 B2 * | 3/2018 | Nory | H04W 16/14 |
| 10,581,577 B2 * | 3/2020 | Li | H04L 5/0055 |
| 2014/0029573 A1 | 1/2014 | Lee et al. | |
| 2014/0036889 A1 | 2/2014 | Kim et al. | |
| 2014/0341024 A1 | 11/2014 | Bhushan et al. | |

(Continued)

FOREIGN PATENT DOCUMENTS

| | | |
|---|---|---|
| CN | 103370896 A | 10/2013 |
| CN | 104301273 A | 1/2015 |

(Continued)

OTHER PUBLICATIONS

WO 2017/076157 A1 (Year: 2016).*

(Continued)

*Primary Examiner* — Ian N Moore
*Assistant Examiner* — Rushil Parimal Sampat
(74) *Attorney, Agent, or Firm* — Sughrue Mion, PLLC (57) ABSTRACT

Embodiments of the present disclosure relate to a method and apparatus of performing the uplink (UL) transmission and receiving. In one embodiment of the present disclosure, a method of performing the UL transmission comprises: determining a transmission start position for the UL transmission from a plurality of potential start positions in a subframe in response to detecting of a clear channel on an unlicensed carrier; and performing the UL transmission from the determined transmission start position.

8 Claims, 6 Drawing Sheets

(56) References Cited

U.S. PATENT DOCUMENTS

| | | | |
|---|---|---|---|
| 2015/0049712 A1 | 2/2015 | Chen et al. | |
| 2015/0055541 A1* | 2/2015 | Zhang | H04W 72/005 370/312 |
| 2015/0195069 A1 | 7/2015 | Yi et al. | |
| 2015/0215097 A1 | 7/2015 | Yi et al. | |
| 2016/0050667 A1* | 2/2016 | Papasakellariou | H04L 5/0053 370/329 |
| 2016/0278050 A1* | 9/2016 | Nory | H04L 5/0053 |
| 2017/0289869 A1* | 10/2017 | Nogami | H04W 36/0072 |
| 2017/0311322 A1* | 10/2017 | Kim | H04W 72/04 |
| 2018/0206269 A1* | 7/2018 | Bhorkar | H04W 74/0816 |

FOREIGN PATENT DOCUMENTS

| | | | |
|---|---|---|---|
| CN | 104486013 | A | 4/2015 |
| CN | 104540230 | A | 4/2015 |
| CN | 104917597 | A | 9/2015 |
| CN | 104994591 | A | 10/2015 |
| CN | 105050189 | A | 11/2015 |

OTHER PUBLICATIONS

Panasonic, "Discussion on UL scheduling and transmission", 3GPP TSG RAN WG1 Meeting #82bis, R1-155350, Malmö, Sweden, Oct. 5-9, 2015, 2 pages total.

ZTE, "Analysis on potential issues and solutions for LAA UL transmission", 3GPP TSG RAN WG1 Ad-hoc Meeting, R1-151027, Paris, France, Mar. 24-26, 2015, 6 pages total.

Extended European Search Report dated Feb. 21, 2019 issued by the European Patent Office in counterpart application No. 16888669.5.

Communication dated Apr. 2, 2019 issued by the Japanese Patent Office in counterpart application No. 2018-515575.

International Search Report of PCT/CN2016/073225 dated Oct. 28, 2016 [PCT/ISA/210].

Written Opinion of PCT/CN2016/073225 dated Oct. 28, 2016 [PCT/ISA/237].

NTT Docomo, Inc., "Support of partial subframe transmission for LAA", 3GPP TSG RAN WG1 Meeting #83, R1-157223, Nov. 15-22, 2015, pp. 1/6-6/6 (total 6 pages).

ITL, "Starting and Ending positions for DL discontinuous transmission", 3GPP TSG RAN WG1 Meeting #83, R1-157296, Nov. 15-22, 2015, total 3 pages.

Communication dated Oct. 29, 2019 from Japanese Patent Office in counterpart JP Application No. 2018-515575.

Communication dated Sep. 1, 2020 by the European Patent Office in application No. 16 888 669.5.

Search Report dated Jul. 13, 2021, from the China National intellectual Property Administration in application No. 2016800580343.

Communication dated Jul. 13, 2021, from the China National intellectual Property Administration in application No. 201680058034.3.

Discussions on DL/UL scheduling for LAA, Huawei et al., 3GPP TSG RAN WG1 Meeting #80bis, R1-151304, Apr. 20-24, 2015 (3 pages total).

On data transmission with partial TTI for LAA, ITL, 3GPP TSG RAN WG1 Meeting #80 bis, May 25-29, 2015, R1-153274, (4 pages total).

Communication dated Jul. 9, 2021, from the European Patent office in application No. 16888669.5.

Communication dated Aug. 17, 2021, from the Japanese Patent office in application No. 2020108887.

UL LBT for self-carrier scheduling, Intel Corporation, 3GPP TSG WG1 Meeting #82bis, R1-155312, Oct. 5-9, 2015, (7 pages total).

Support of partial subframe transmission for LAA, NTT Docomo, Inc., 3GPP TSG RAN WG1 Meeting #83, R1-157223, Nov. 15-22, 2015, (6 pages total).

Chinese Office Communication for CN Application No. 201680058034.3 dated Aug. 3, 2022 with English Translation.

ZTE. "Frame structure design for LAA considering LBT". 3GPP TSG-RAN WG1 Meeting #80 R1-150154, Feb. 18. 2015.

Japanese Office Action for JP Application No. 2021-190115 dated Nov. 22, 2022 with English Translation.

* cited by examiner

Fig. 11

METHODS AND APPARATUSES FOR UPLINK TRANSMISSION ON AN UNLICENSED SPECTRUM

CROSS REFERENCE TO RELATED APPLICATIONS

This application is a National Stage of International Application No. PCT/CN2016/073225, filed Feb. 2, 2016, the contents of which are incorporated herein by reference in its entirety.

FIELD OF THE INVENTION

Embodiments of the present disclosure generally relate to wireless communication techniques and more particularly relate to a method and apparatus for performing uplink (UL) transmission and a method and apparatus for performing UL receiving.

BACKGROUND OF THE INVENTION

In 3rd Generation Partnership Project (3GPP), the network structure and various technologies needed for a terminal's movement between a 3GPP wireless communication network and a Wireless Local Area Network (WLAN) network are called interworking WLAN. The multi-mode wireless communication technology has evolved to use multiple wireless communication technologies at the same time. The use of multiple wireless communication technologies simultaneously thereby increases transfer rates per unit time or improves the reliability of the terminal.

In wireless communication, the spectrum is very rare resource. A licensed band represents a frequency band that is exclusively licensed to a specific operator to provide specific wireless services. On the other hand, an unlicensed band represents a frequency band that is not allocated to a specific operator, but is opened so that all entities meeting the predefined requirements may use the frequency band.

In some regions in the world, unlicensed band technologies need to abide to certain regulations, for example, Listen-Before-Talk (LBT), and channel bandwidth occupancy requirements. LBT results in an uncertainty of channel availability. For instance, an unlicensed band may be available at any time during a subframe.

In Long term evolvement (LTE) systems, UL transmission is controlled by an evolved node B (eNB); in other word, UE will transmit signals according to a UL grant from the eNB. Thus, there is a time delay between the UL data transmission and UL grant transmission. In view of the foregoing and the uncertain downlink (DL) and UL burst length, there might be no enough DL subframes to send the UL grants for the UL transmission if legacy schemes for UL transmission are used.

SUMMARY OF THE INVENTION

In the present disclosure, there is provided a new solution for UL transmission and receiving to mitigate or at least alleviate at least part of the issues in the prior art.

According to a first aspect of the present disclosure, there is provided a method of performing UL transmission. The method may comprise determining a transmission start position for the UL transmission from a plurality of potential start positions in a subframe in response to detecting of a clear channel on an unlicensed carrier; and performing the UL transmission from the determined transmission start position.

In a second aspect of the present disclosure, there is provided a method of performing an UL receiving. The method may comprise determining a receiving start position for the UL receiving, wherein the receiving start position is one of a plurality of potential start positions in a subframe; and performing the UL receiving from the determined receiving start position.

In a third aspect of the present disclosure, there is also provided an apparatus for performing UL transmission. The apparatus may comprise a transmission position determination unit, configured to determine a transmission start position for the UL transmission from a plurality of potential start positions in a subframe in response to detecting of a clear channel on an unlicensed carrier; and a UL transmission performing unit, configured to perform the UL transmission from the determined transmission start position.

In a fourth aspect of the present disclosure, there is provided an apparatus for performing UL receiving. The apparatus may comprise a receiving position determination unit, configured to determine a receiving start position for the UL receiving, wherein the receiving start position is one of a plurality of potential start positions in a subframe; and a UL receiving performing unit, configured to perform the UL receiving from the determined receiving start position.

According to a fifth aspect of the present disclosure, there is also provided a computer-readable storage media with computer program code embodied thereon, the computer program code configured to, when executed, cause an apparatus to perform actions in the method according to any embodiment in the first aspect.

According to a sixth aspect of the present disclosure, there is further provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where FIG. 1 schematically illustrates a flow chart of a method 100 for performing UL transmission according to an embodiment of the invention.

DETAILED DESCRIPTION OF EMBODIMENTS

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

Embodiments of the present disclosure are directed to a new solution for UL transmission and receiving. The solution can be performed between a serving node like eNB and a terminal device like UE, so as to support a partial subframe transmission. Particularly, upon detecting of a clear channel on an unlicensed carrier, the terminal device may determine a transmission start position for the UL transmission from a plurality of potential start positions in a subframe and preform the UL transmission from the determined transmission start position. The serving node determines the receiving start position for the UL receiving and performs the UL receiving from the determined receiving start position. In such a way, it may perform the UL transmission starting from a partial subframe. Besides, it may also additionally or alternatively support a UL transmission ending at a partial subframe. In such a case, the serving node may transmit end position indication information to the terminal device and perform the UL receiving based on the end position indication information, wherein a receiving end position of the UL receiving is one of a plurality of potential end positions. Accordingly, the terminal device may receive the end position indication information and perform the UL transmission based on the end position indication information. In this way, once a channel enters an idle state, the transmission may start from the current subframe, instead of the next subframe and thus, resource utilization is improved. Besides, it is possible reduce the time delay between the UL data transmission and the UL grant transmission and improve the resource utilization.

In some embodiments of the present disclosure, the UL transmission may be uplink cellular transmission. In the uplink cellular transmission, the terminal device may comprise UE, such as a terminal, an MT, an SS, a PSS, an MS, or an AT. Meanwhile, the serving node may comprise a BS, such as a node B (NodeB or NB), or an evolved NodeB (eNodeB or eNB).

According to other embodiments of the present invention may be applied in various communication systems, including but not limited to a Long Term Evolution (LTE) system or a Long Term Evolution Advanced (LTE-A) system. Given the rapid development in communications, there will also be future type wireless communication technologies and systems with which the present invention may be embodied without any doubts. Thus, it should not be appreciated as limiting the scope of the invention to only the aforementioned system.

Hereinafter, some exemplary embodiments of the present invention will be described below with reference to FIGS. 1 to 11 in details. However, it shall be appreciated that these exemplary embodiments are presented only for purposes of illustration and the present disclosure is not limited to specific details described with reference to the exemplary embodiments.

Figure 1:
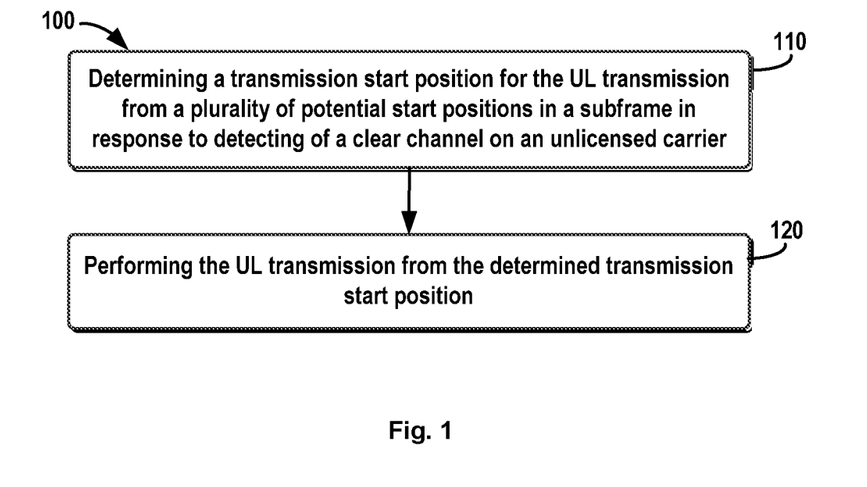

Reference will be first made to FIG. 1, which schematically illustrates a flow chart of a method 100 of performing UL transmission in accordance with one embodiment of the present disclosure. The method 100 can be performed for example a terminal device such as UE, or any other suitable device.

As illustrated in FIG. 1, the method 100 starts from step 110, in which, in response to detecting of a clear channel on an unlicensed carrier, a transmission start position for the UL transmission is determined from a plurality of potential start positions in a subframe.

According to embodiments of the present invention, a subframe may comprise a plurality of symbols. By way of example, a subframe may be 1 ms and comprise 14 symbols, for example, symbols 0 to 13. However, it shall be appreciated that this subframe structure is that used in the current LTE system and it is given just for a purpose of illustration. This subframe structure will be taken an example in the following context; but the present disclosure is not limited thereto and in fact, it is also possible that a subframe may have a different structure in another communication system or a future communication system, for example, it may have more or less symbols in the subframe.

A term "position" used herein, such as that used in a potential start position, a potential end position, a transmission start position, a transmission start position, a current position, a next position, may refer to a time point or a time period in the subframe. In some embodiments, a position may correspond to an instant in a subframe. As an alternative, a position may correspond to a symbol of subframe. In this regard, the position may occupy a time period, for example, the time period of a symbol. Particularly, in the context, a transmission start position may refer to a target position from which the UL transmission may start, and a potential start position may refer to a predefined position that is a candidate of the transmission start position.

According to embodiments of the present invention, there may be more than one potential start positions predefined in a subframe. In other words, in addition to a subframe boundary, it may further comprise one or more further start point within the subframe. For example, the plurality of potential start positions may comprise any of a subframe boundary; a slot boundary; start points of any symbols; and a start point of Uplink Pilot Time Slot (UpPTS). In other word, the potential start points of UL transmission may be any two or more from the subframe boundary, the slot boundary; the start point of any symbol, or the start point of UpPTS. The subframe boundary means that the UL transmission can be start from a boundary of a subframe and it belongs to a full-subframe transmission; the slot boundary means the UL transmission can start from the middle of the subframe or from the last seven symbols in a subframe, and it means a half-subframe transmission; the start point of any symbol means that the UL transmission can start from any of symbols 0 to 13, i.e., each symbol in a subframe may be predefined as a potential position, which belongs to other forms of partial-subframe transmission; and the start point of UpPTS means that the UL transmission can start from the last six symbols in a subframe and it means a further form of partial-subframe transmission.

According to embodiments of the present invention, Clear Channel Assessment (CCA) or Extended Clear Channel Assessment (eCCA) may be performed. With the CCA/eCCA, the transmitter may detect whether a channel is available on an unlicensed carrier. In response to detecting that the channel becomes available, the transmitter may determine the transmission start position from a plurality of potential start positions in several ways. In some embodiments, it is first detected whether a current position is a potential start position or not. If it is determined that the current position is a potential start position, the potential start position may be determined as the target position for the UL transmission, i.e., the transmission start position; otherwise, the detection of potential start position is continued until a potential start position is detected and determined as the transmission start position. Moreover, a reservation signal can be transmitted to reserve the clear channel before the determined transmission start position. That is to say, the reservation signal can be transmitted before the performing the UL transmission.

In addition, start position indication information may be further transmitted to the serving node such as eNB, wherein the start position indication information indicates the determined transmission start position for the UL transmission. It can be appreciated that since the UL transmission might not start from a fixed start point such as a subframe boundary, and thus it is beneficial if the serving node learns where the UL transmission starts since it may facilitate the UL receiving a lot. It can be appreciated that it is also feasible to detect the UL signal in a blind way and in such a case, it is not required for the serving node to learn the transmission start position. However, the information on the transmission start position will ensure the accuracy of the detected signals.

In step 120, the UL transmission may be performed from the determined transmission start position. The UL transmission may comprise transmitting Physical Uplink Control Channel (PUCCH) signals and Physical Uplink Sharing Channel (PUSCH) signals, wherein the PUSCH signals may include a scheduling request, ACK/NACK, Channel State Information (CSI), etc. According to embodiments of the present disclosure, once the transmission start point is determined, the UL transmission can be performed from the determined transmission start position. Thus, in embodiments of the present disclosure, the determined transmission start position is usually the earliest potential position from which the UL transmission can start and thus the resource utilization can be improved.

Figure 2:
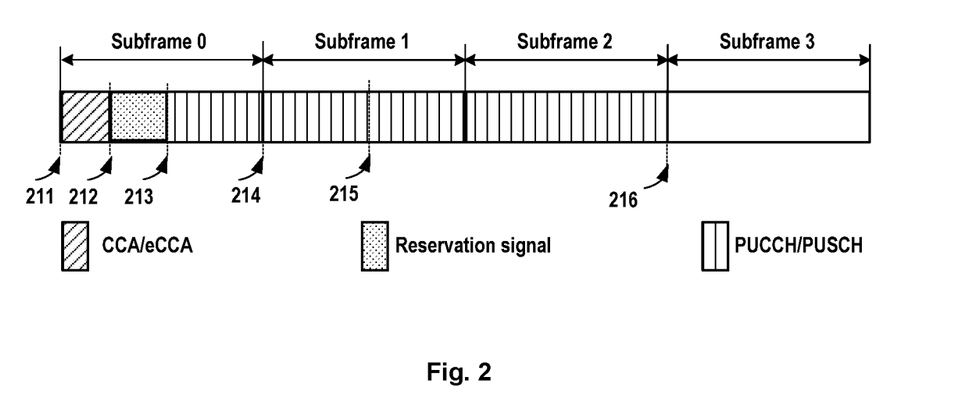
FIG. 2 schematically illustrates a schematic diagram of UL transmission scheme according to one embodiment of the invention.

FIG. 2 schematically illustrates a schematic diagram of UL transmission scheme according to one embodiment of the present disclosure. FIG. 2 exemplarily shows four subframes, subframes 0 to 3. For subframe 0, there are two potential start positions 211, 213 and for subframe 1, there are also two potential start positions 214 and 215 as well. Specifically, the potential start positions 211 and 214 correspond to a subframe boundary, i.e., the start point of subframe or the start point of the first time slot in the subframe; the potential start positions 213 and 215 correspond to a slot boundary, i.e., the start point of the second time slot in a subframe. During the CCA/eCCA, the terminal device may determine that the channel is available at a position 212. Since the position 212 is not a potential start position, the terminal device may transmit a reservation signal from the position 212 until a potential position, for example, the potential start position 213, the earliest potential start position from the position 212 at which the clear channel is detected. The potential position 213 can be determined as the transmission start position for the UL transmission and the UL transmission then may start from the determined transmission start position. Thus, it is clear that in this example, the transmission start position is determined as the potential position 213 and the UL transmission is performed from the position 213 in the current subframe without waiting until the next subframe.

Figure 3:
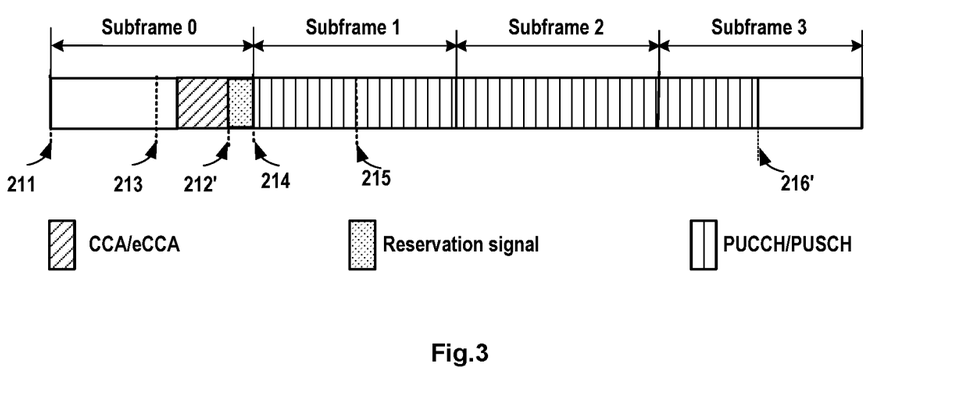
FIG. 3 schematically illustrates another schematic diagram of UL transmission scheme according to another embodiment of the invention.

FIG. 3 schematically illustrates a schematic diagram of UL transmission scheme according to another embodiment of the present disclosure. The UL transmission scheme as illustrated in FIG. 3 is similar to that in FIG. 2 except that the position at which the channel is available. In FIG. 3, during the CCA/eCCA, the transmitter may determine that the channel is available at a position 212' instead of position 212. In FIG. 3, the position 212' is not a potential position and it is after the potential position 211 and 213, and thus the terminal device may transmit a reservation signal from the position 212' until the next potential position. The next potential position is, for example, potential position 214 which is the earliest potential start position from the position 212' at which the clear channel is detected, and the potential position 214 may be determined as the transmission start position. In such a case, the UL subframe transmission may start from the boundary of the next subframe which it is still the earliest potential start point from the position 212'.

Herein, it shall be appreciated that FIG. 2 and FIG. 3 illustrate two example potential transmission positions in a subframe only for illustrative purposes and in fact the present disclosure is not limited thereto. In some embodiments of the present disclosure, there might be potential start positions different from those illustrated in FIG. 2 or FIG. 3 and/or there might be more potential start positions. In fact, these potential start positions can be any suitable combinations of the subframe boundary, the slot boundary; the start point of any symbol, and the start point of UpPTS.

Besides, it may also support a UL transmission ending at a partial subframe, which will be described in details with reference to FIG. 4. It shall be appreciated that the solution supporting the UL transmission ending at the partial subframe can be used as an additional solution for the solution supporting the UL transmission starting from a partial subframe; or it can be performed as an alternative solution for the solution supporting the UL transmission starting from a partial subframe. In other word, the two solutions can be used together, or the two solutions can be used separately and independently. That is to say, each of the two solutions can be claimed separately.

Figure 4:
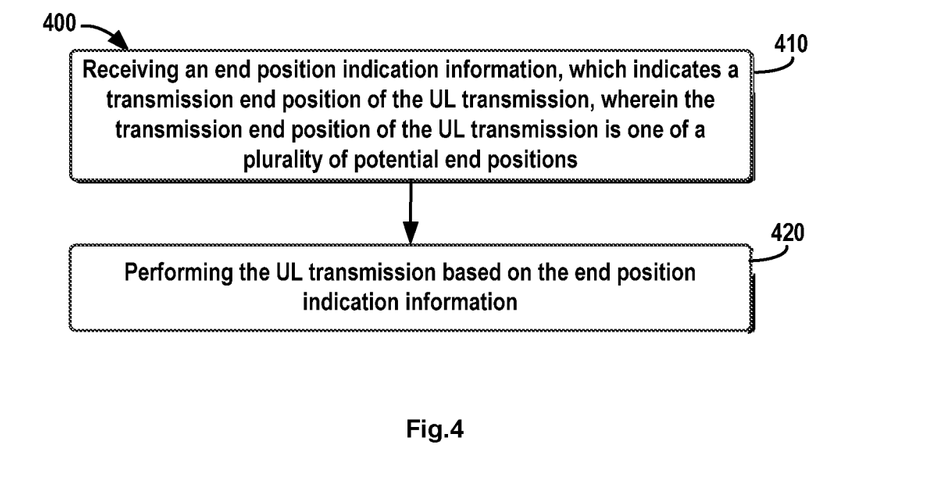
FIG. 4 schematically illustrates a flow chart of a method 400 for performing UL transmission according to another embodiment of the invention.

Reference is made to FIG. 4, which illustrates a flow chart of a method 400 for performing UL transmission according to another embodiment of the invention. The method 400 can be performed for example a terminal device such as UE, or any other suitable device.

As illustrated in FIG. 4, the method starts from 410, in which end position indication information is received, which indicates a transmission end position of the UL transmission. The transmission end position used herein may refer to a target position at which the UL transmission may end. The end position indication information can be received in various ways. For example, it may be received from a new RRC signaling, or bits in DCI format 1C which may indicate the transmission end position implicitly or explicitly.

The transmission end position of the UL transmission can be one of a plurality of potential end positions. The potential end position may refer to a predefined position that is a candidate of the transmission end position. In embodiments of the present disclosure, in addition to ending in a full-subframe way, it is also allowable for the UL transmission to end in a partial-subframe way. In other word, the UL transmission can end within a subframe and it is not required that the UL transmission to end at the end point of the subframe.

In some embodiments of the present disclosure, the plurality of potential end positions comprise any of: a subframe boundary; a slot boundary; end points of any symbols; and end points of predetermined symbols. The subframe boundary and the slot boundary are already described hereinbefore with reference to the solution supporting the UL transmission starting from a partial subframe and thus they will be not elaborated herein. The end points of any symbols mean a solution that the UL transmission can end at any symbol. The end points of predetermined symbols mean a solution wherein the UL transmission are allowed to end at end points of predetermined symbols instead of end points of any symbols. For purpose of illustration, examples of predetermined symbols will be described hereinafter.

As mentioned, there may be one or more potential end positions predefined in a subframe. Each of the potential end positions may correspond to a symbol of the subframe periodically or aperiodically. In some embodiments of the present disclosure, it may use similar structure as Downlink Pilot Time Slot (DwPTS). That is to say, the predetermined symbols may comprise symbols 3, 6, 9, 10, 11, 12. In addition, the predetermined symbols may comprise any subset of symbols 3, 6, 9, 10, 11, 12.

In other embodiments, the potential end positions may comprise every k symbols, for example, symbols 0, 3, 6, 9 and 12 (k=3). For instance, the potential positions may be set at $$\mod(N, Nd) = x (x \in [0, Nd-1]), \quad (1)$$

where N represents the index of a symbol in a subframe, and Nd represents the interval between two potential positions and may be an integer ranged from 1 to the total number of symbols in the subframe, for example 14. According to equation (1), it may be determined that the smaller the Nd is, the denser the potential positions are.

It is to be noted that the above examples are illustrated for example, rather than limitation. It can be appreciated that, in alternative embodiments, there may be aperiodic configurations of the potential positions. For instance, the potential positions may correspond to the symbols 0, 3, 8 and 12.

Next, in step 420, the UL transmission can be performed based on the end position indication information. As illustrated in FIG. 2, the UL transmission can end at position 216, i.e., the start point of subframe 3; in other word, it ends at the end point of subframe 2. On the other hand, as illustrated in FIG. 3, the UL transmission can also end at position 216' i.e., the slot boundary of the second slot in subframe 3.

Herein, it shall be appreciated that FIG. 2 and FIG. 3 illustrate two different potential end positions in a subframe only for illustrative purposes, and in fact the present disclosure is not limited thereto. In some embodiments of the present disclosure, there might be potential end positions different from those illustrated in FIG. 2 or FIG. 3 and/or there might be more potential end positions. In fact, these potential end positions can be any suitable combinations of the subframe boundary, the slot boundary; end points of any symbols, and end points of predetermined symbols. Besides, FIG. 2 and FIG. 3 illustrates the UL transmission supporting both the partial-subframe start and the partial-subframe end; however, as mentioned hereinabove, the partial-subframe start solution and the partial-subframe end solution can also be used separately and independently, and thus be claimed separately and independently.

Now, reference will be made to FIG. 5, which schematically illustrates a flow chart of a method 500 of performing UL receiving in accordance with one embodiment of the present disclosure, wherein the method 500 is implemented in the serving mode such as eNB.

Figure 5:
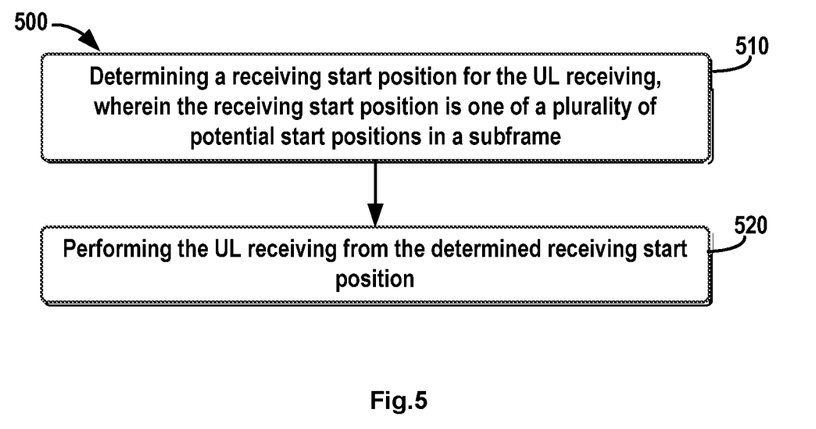
FIG. 5 schematically illustrates a flow chart of a method 500 of performing UL receiving in accordance with one embodiment of the present disclosure.

As illustrated in FIG. 5, the method 500 start from step 510, in which a receiving start position for the UL receiving is determined, wherein the receiving start position is one of a plurality of potential start positions in a subframe. As described with reference to FIG. 1, the UL transmission may start from any of the plurality of potential start positions. The plurality of potential start positions comprise any of: a subframe boundary; a slot boundary; a start point of symbol; and a start point of Uplink Pilot Time Slot (UpPTS). In such a case, at the serving node such as eNB, the serving node may perform a blind detection at all potential start positions to determine transmission start position of the UL transmission. The determined transmission start position of the UL transmission will be taken as the receiving start position for the UL receiving.

In other embodiment of the present disclosure, the terminal device may send start position indication information to the serving node, so as to indicate the transmission start position from which UL transmission is actually performed. The serving node can receive the start position indication information and obtains the transmission start position therefrom and determine the obtained transmission start position as the receiving start position for the UL receiving.

Next, in step 520, the UL receiving is performed from the determined receiving start position to obtain the data transmitted in the UL signals.

Figure 6:
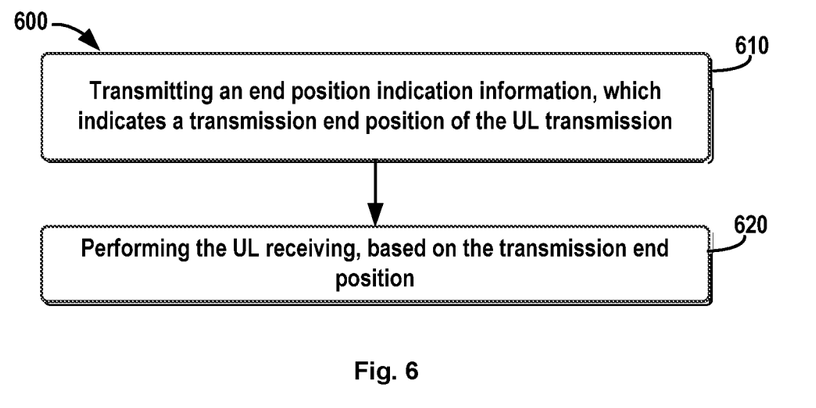
FIG. 6 schematically illustrate a flow chart of a method 600 of performing UL receiving in accordance with another embodiment of the present disclosure.

Reference is further made to FIG. 6 to describe a solution supporting the UL receiving ending at a partial subframe, wherein FIG. 6 schematically illustrate a flow chart of a method 600 of performing UL receiving in accordance with another embodiment of the present disclosure. The method 600 can be implemented at the serving node such eNB.

First, in step 610, end position indication information is transmitted, which indicates a transmission end position of UL transmission.

The end position of the UL transmission may be determined by the serving node such as eNB. The eNB can determine the end position in any suitable ways. In embodiments of the present disclosure, it may be determined based on a default transmission position, the amount of signals to be transmitted and the allowed maximum channel occupancy time, or any other suitable information. Or the end position of the UL transmission can just be determined as a position from a default transmission start point by a fixed number of subframes.

The end position indication information can be received in various ways. For example, it may be sent by a new RRC signaling, or by bits in DCI format 1C implicitly or explicitly.

In some embodiments of the present disclosure, the plurality of potential end positions can comprise any of: a subframe boundary; a slot boundary; end points of any symbols; and end points of predetermined symbols. The predetermined symbols may comprise a plurality of symbols within the subframe which are periodical or aperiodic. For example, the predetermined symbols may comprise symbols 3, 6, 9, 10, 11, 12 or any subset thereof. In another embodiment of the present disclosure, the potential end positions may comprise every k symbols, for example, symbols 0, 3, 6, 9 and 12 (k=3). That is to say, the predetermined symbols may comprise symbols 0, 3, 6, 9 and 12. However, it can be understood that the predetermined symbols may also be symbols 0, 3, 8 and 12, or any other symbols with different aperiodic configurations or periodic configurations.

Next, in step 620, the UL receiving is performed based on the transmission end position of the UL transmission. In other word, the UL receiving may end at the transmission end position. In a case, the terminal device does not perform the UL transmission at the default transmission position, the serving node may re-estimate the actual end position based on the difference between the default transmission position and the actual transmission and the determined transmission end position.

In a case that the UL transmission is allowed to end within a subframe, a transport block size for the UL transmission shall be adjusted accordingly. The transport block size indicates the size of a data block to be transmitted in the UL transmission. According to embodiments of the present invention, the transport block size may be adjusted by a scaling factor, which may be determined in various ways. In some embodiments, the end symbols of the last subframe may be considered as available symbols of a partial subframe. It may determine a scaling factor associated with the number of the available symbols, and then determine the transport block size based on the scaling factor. The scaling factor may be defined in several ways. Table 1 illustrates an example of scaling factors associated with different numbers of available symbols.

TABLE 1

| Number of available symbols | Scaling factor |
| --- | --- |
| 1, 2, 3 | N/A |
| 4 | 0.25 |
| 5 | 0.25, 0.375 |
| 6 | 0.375 |
| 7 | 0.375, 0.5 |
| 8 | 0.5, 0.75 |
| 9, 10, 11, 12 | 0.75 |
| 13, 14 | 1 |

The scaling factor may be determined based on table 1 and the number of available symbols in the partial subframe. For example, if the number of available symbols is 4, the scaling factor may be determined as 0.25; if the number of available symbols is 10, the scaling factor may be determined as 0.75.

In some embodiments, the transport block size may be determined based on the scaling factor in several ways. By way of example, a first resource block number which indicates a number of resource blocks allocated for transmission may be obtained. For the serving node such as eNB, the first resource block number may be determined in real time. Then, a second resource block number may be determined based on the first resource block number and the scaling factor. In an exemplary embodiment, the second resource block number may be determined as follows:

$$N_{PRB}=\max\{\lfloor N_{PRB}'\times \text{Factor}\rfloor, 1\} \quad (2)$$

wherein $N'_{PRB}$ represents the first resource block number, $N_{PRB}$ represents the second resource block number, Factor represents the scaling factor. Thus, the transport block size may be determined.

It shall be appreciated that the above examples are just presented for purposes of illustration. In fact, it is also possible to determine the transport block size by other means, for example a transport block size table.

Figure 7:
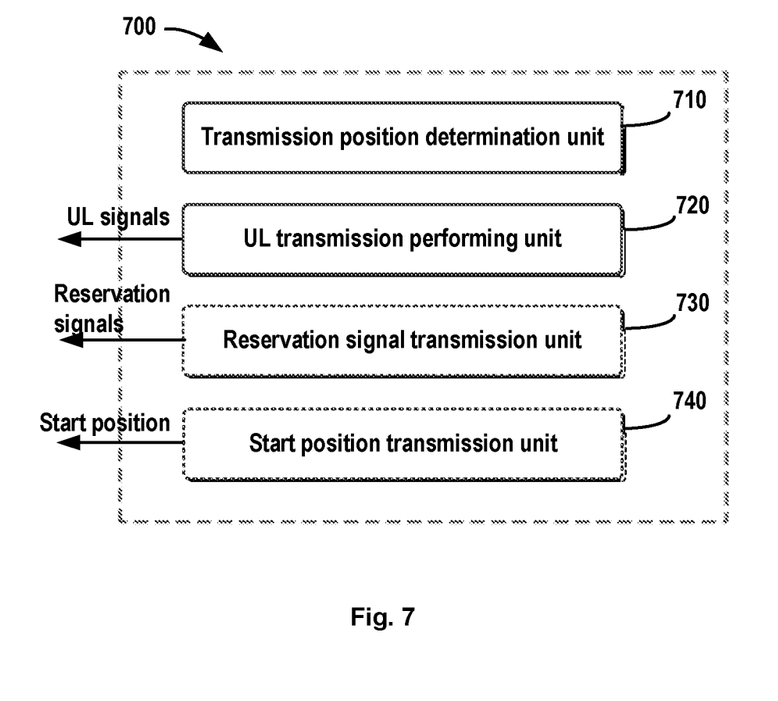
FIG. 7 schematically illustrates a block diagram of an apparatus 700 for performing UL transmission in accordance with one embodiment of the present disclosure.

FIG. 7 schematically illustrates a block diagram of an apparatus 700 for performing UL transmission in accordance with one embodiment of the present disclosure. In accordance with embodiments of the present disclosure, the apparatus 700 can be implemented at a user terminal device such as UE to support a partial-subframe start UL transmission.

As illustrated in FIG. 7, the apparatus 700 comprises a transmission position determination unit 710 and a UL transmission performing unit 720. The transmission position determination unit can be configured to determine a transmission start position for the UL transmission from a plurality of potential start positions in a subframe in response to detecting of a clear channel on an unlicensed carrier. The UL transmission performing unit 720 can be configured to perform the UL transmission from the determined transmission start position.

In an embodiment of the present disclosure, the plurality of potential start positions can comprise any of: a subframe boundary; a slot boundary; start points of any symbols; and a start point of UpPTS.

In a further embodiment of the present disclosure, the apparatus 700 may further comprise a reservation signal transmission unit 730. The reservation signal transmission unit 710 may be configured to transmit a reservation signal to reserve the clear channel before the performing the UL transmission.

In a still further embodiment of the present disclosure, the apparatus 700 may comprise a start position transmission unit 740, configured to transmit start position indication information, which indicates the determined transmission start position for the UL transmission. In such a way, the serving node such as eNB can learn the actual transmission start position.

Figure 8:
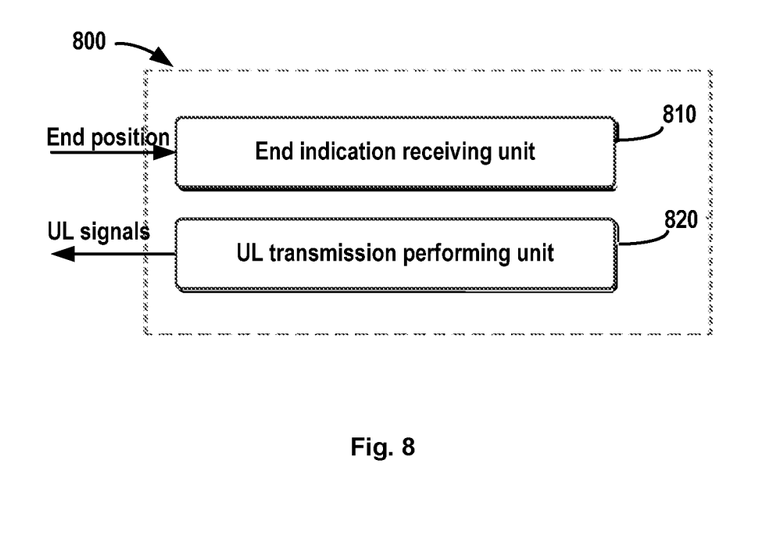
FIG. 8 schematically illustrates a block diagram of an apparatus 800 for performing UL transmission in accordance with another embodiment of the present disclosure.

FIG. 8 schematically illustrates a block diagram of an apparatus 800 for performing UL transmission in accordance with another embodiment of the present disclosure. In accordance with embodiments of the present disclosure, the apparatus 800 can be implemented at a user terminal device such as UE to support a partial-subframe end UL transmission.

As illustrated in FIG. 800, the apparatus 800 can comprises an end indication receiving unit 810 and a UL transmission performing unit 820. The end indication receiving unit 810 can be configured to receive end position indication information which indicates the transmission end position of the UL transmission. The UL transmission performing unit 820 can be configured to perform the UL transmission based on the end position indication information.

In an embodiment of the present disclosure, the transmission end position of the UL transmission may be one of a plurality of potential end positions.

In a further embodiment of the present disclosure, the plurality of potential end positions may comprise any of: a subframe boundary; a slot boundary; end points of any symbols; and end points of predetermined symbols.

It can be appreciated that apparatus 800 can be incorporated into apparatus 700 to form as a component thereof and in such a case, the UL transmission performing units 720 and 820 can be incorporated into one unit. As an alternative, the apparatus 800 can also be implemented as an apparatus independent from apparatus 700 and thus be claimed alone.

Figure 9:
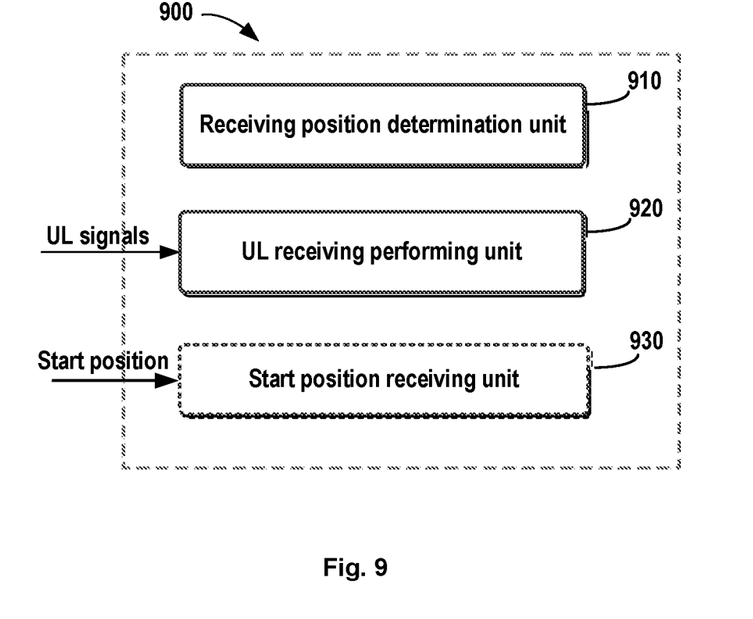
FIG. 9 schematically illustrates a block diagram of an apparatus 900 for performing UL receiving in accordance with one embodiment of the present disclosure.

FIG. 9 schematically illustrates a block diagram of an apparatus 900 for performing UL receiving in accordance with one embodiment of the present disclosure. In accordance with embodiments of the present disclosure, the apparatus 900 can be implemented at a serving node such as eNB to support UL receiving that starts from a partial subframe.

As illustrated in FIG. 9, apparatus 900 comprises a receiving position determination unit 910 and a UL receiving performing unit 920. The receiving position determination unit 910 may be configured to determine a receiving start position for the UL receiving, wherein the receiving start position is one of a plurality of potential start positions in a subframe. The UL receiving performing unit 920 may be configured to perform the UL receiving from the determined receiving start position.

In an embodiment of the present disclosure, the plurality of potential start positions may comprise any of: a subframe boundary; a slot boundary; a start point of symbol; and a start point of Uplink Pilot Time Slot (UpPTS).

In another embodiment of the present disclosure, the apparatus 900 may further comprise a start position receiving unit 930, which may be configured to receive start position indication information which indicates the transmission start position from which UL transmission is performed. In such a case, the receiving position determination unit 910 is further configured to determine the receiving start position for the UL receiving based on the transmission start position as indicated in the start position indication information.

Figure 10:
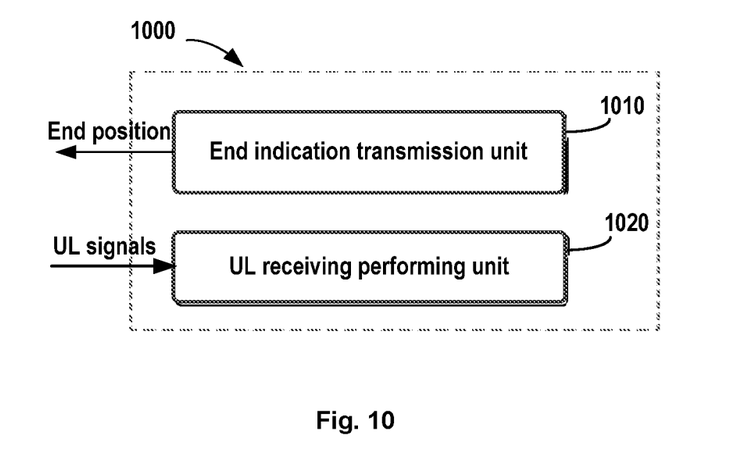
FIG. 10 schematically illustrates a block diagram of an apparatus 1000 for performing UL receiving in accordance with another embodiment of the present disclosure.

FIG. 10 schematically illustrates a block diagram of an apparatus 1000 for performing UL receiving in accordance with another embodiment of the present disclosure. In accordance with embodiments of the present disclosure, the apparatus 1000 can be implemented at a serving node such as eNB to support UL receiving that ends at a partial subframe.

As illustrated, the apparatus 1000 comprises an end indication transmission unit 1010 and a UL receiving performing unit 1020. The end indication transmission unit 1010 may be configured to transmit end position indication information which indicates the transmission end position of UL transmission. The UL receiving performing unit 1020 is configured to perform the UL receiving based on the transmission end position of the UL transmission.

In an embodiment of the present disclosure, a receiving end position of the UL receiving may be one of a plurality of potential end positions.

In a further embodiment of the present disclosure, the plurality of potential end positions may comprise any of: a subframe boundary; a slot boundary; end points of any symbols; and end points of predetermined symbols.

It shall be appreciated that apparatus 1000 can be incorporated into apparatus 900 to form a component thereof and in such a case, the UL receiving performing units 920 and 1020 can be incorporated into one single unit. As an alternative, the apparatus 1000 can also be implemented as an apparatus independent from apparatus 900 and thus be claimed alone.

Hereinbefore, the apparatuses 700, 800, 900 and 1000 are described in brief with reference to FIGS. 7 to 10. It is noted that the apparatuses 700, 800, 900 and 1000 may be configured to implement functionalities as described with reference to FIGS. 1 to 6. Therefore, for details about the operations of modules in these apparatuses, one may refer to those descriptions made with respect to the respective steps of the methods with reference to FIGS. 1 to 6.

It is further noted that the components of the apparatuses 700, 800, 900 and 1000 may be embodied in hardware, software, firmware, and/or any combination thereof. For example, the components of apparatuses 700, 800, 900 and 1000 may be respectively implemented by a circuit, a processor or any other appropriate selection device. In addition, those skilled in the art will appreciate that the aforesaid examples are only for illustration not for limitation and the present disclosure is not limited thereto; one can readily conceive many variations, additions, deletions and modifications from the teaching provided herein and all these variations, additions, deletions and modifications fall the protection scope of the present disclosure.

Additionally, in some embodiments of the present disclosure, apparatuses 700, 800, 900 and 1000 may each comprise at least one processor. The at least one processor suitable for use with embodiments of the present disclosure may include, by way of example, both general and special purpose processors already known or developed in the future. Apparatuses 700, 800, 900 and 1000 may each further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 700, 800, 900 and 1000 to at least perform operations according to the method as discussed with reference to FIGS. 1 to 6 respectively.

Figure 11:
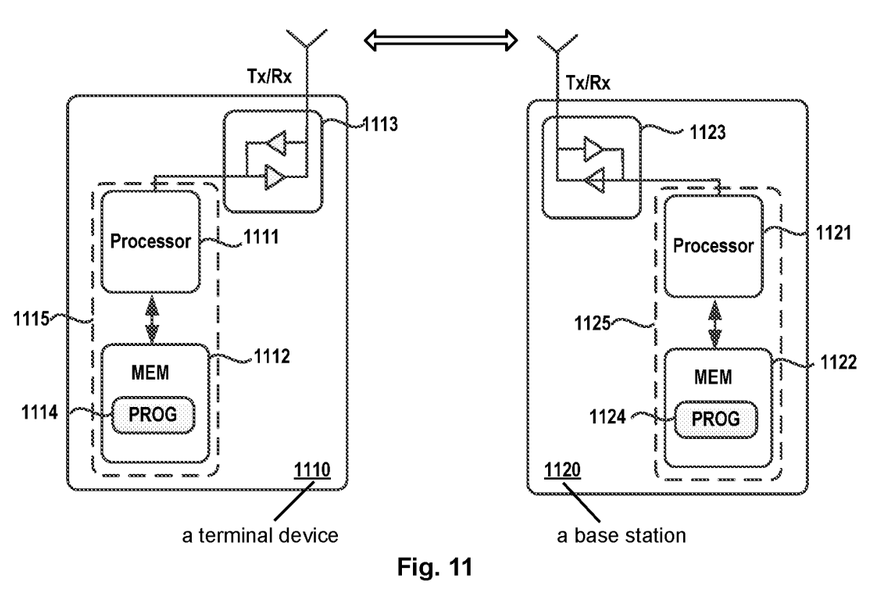
FIG. 11 further illustrates a simplified block diagram of an apparatus 1110 that may be embodied as or comprised in UE and an apparatus 1120 that may be embodied as or comprised in a base station in a wireless network as described herein.

FIG. 11 further illustrates a simplified block diagram of an apparatus 1110 that may be embodied as or comprised in a terminal device such as UE for a wireless network in a wireless network and an apparatus 1120 that may be embodied as or comprised in a base station such as NB or eNB as described herein.

The apparatus 1110 comprises at least one processor 1111, such as a data processor (DP) and at least one memory (MEM) 1112 coupled to the processor 1111. The apparatus 1110 may further comprise a transmitter TX and receiver RX 1113 coupled to the processor 1111, which may be operable to communicatively connect to the apparatus 1120. The MEM 1112 stores a program (PROG) 1114. The PROG 1114 may include instructions that, when executed on the associated processor 1111, enable the apparatus 1110 to operate in accordance with embodiments of the present disclosure, for example to perform the method 100 and/or 400. A combination of the at least one processor 1111 and the at least one MEM 1112 may form processing means 1115 adapted to implement various embodiments of the present disclosure.

The apparatus 1120 comprises at least one processor 1121, such as a DP, and at least one MEM 1122 coupled to the processor 1121. The apparatus 1120 may further comprise a suitable TX/RX 1123 coupled to the processor 1121, which may be operable for wireless communication with the apparatus 1110. The MEM 1122 stores a PROG 1124. The PROG 1124 may include instructions that, when executed on the associated processor 1121, enable the apparatus 1120 to operate in accordance with the embodiments of the present disclosure, for example to perform the method 500 and/or 600. A combination of the at least one processor 1121 and the at least one MEM 1122 may form processing means 1125 adapted to implement various embodiments of the present disclosure.

Various embodiments of the present disclosure may be implemented by computer program executable by one or more of the processors 1111, 1121, software, firmware, hardware or in a combination thereof.

The MEMs 1112 and 1122 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1111 and 1121 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a user equipment (UE), the method comprising:
   receiving first information from a base station;
   determining second information; and
   notifying the second information to the base station,
      wherein the first information indicates an ending symbol of a Physical Uplink Shared Channel (PUSCH) transmission in an unlicensed spectrum, wherein the ending symbol is selected by the base station from a group of n potential ending symbols within a subframe, 1<n<14, wherein the subframe comprises a 1st symbol to a 14th symbol, wherein the n potential ending symbols include a 13th symbol of the subframe, and wherein the second information indicates a starting position of the PUSCH transmission from among a plurality of potential symbol positions within a subframe; and
   performing the PUSCH transmission from the starting position after detecting a channel on the unlicensed spectrum to be idle, such that the PUSCH transmission ends at the ending symbol indicated by the first information, the PUSCH transmission being performed within the ending symbol, wherein the ending symbol is used to determine a scaling factor associated with a number of available symbols, and to determine a transport block size based on the scaling factor, and wherein the notifying comprises the UE notifying the second information to the base station before performing the PUSCH transmission.

2. The method of claim 1, wherein the n potential ending symbols further include the 14th symbol of the subframe.

3. The method of claim 1, wherein the first information is a bit of DCI format.

4. A method performed by a base station, the method comprising:
   transmitting first information to a user equipment (UE);
   receiving, from the UE, second information determined by the UE, wherein the first information indicates an ending symbol of a Physical Uplink Shared Channel (PUSCH) transmission in an unlicensed spectrum, wherein the ending symbol is selected by the base station from a group of n potential ending symbols within a subframe, 1<n<14, wherein the subframe comprises a 1st symbol to a 14th symbol, wherein the n potential ending symbols include a 13th symbol of the subframe, wherein the second information indicates a starting position of the PUSCH transmission from among a plurality of potential symbol positions within a subframe; and
   receiving the PUSCH transmission from the starting position after a channel on the unlicensed spectrum is detected to be idle, such that the PUSCH transmission ends at the ending symbol indicated by the first information, the PUSCH transmission being performed within the ending symbol, wherein the ending symbol is used to determine a scaling factor associated with a number of available symbols, and to determine a transport block size based on the scaling factor, and wherein the receiving comprises the base station receiving the second information from the UE before receiving the PUSCH transmission.

5. The method of claim 4, wherein the n potential ending symbols further include the 14th symbol of the subframe.

6. The method of claim 4, wherein the first information is a bit of DCI format.

7. A user equipment (UE), comprising:

a transceiver configured to:

receive first information from a base station; and a controller configured to:

determine second information, wherein the transceiver is configured to notify the second information to the base station, wherein the first information indicates an ending symbol of a Physical Uplink Shared Channel (PUSCH) transmission in an unlicensed spectrum, wherein the ending symbol is selected by the base station from a group of n potential ending symbols within a subframe, 1<n<14, wherein the subframe comprises a 1st symbol to a 14th symbol, wherein then potential ending symbols include a 13th symbol of the subframe wherein the second information indicates a starting position of the PUSCH transmission from among a plurality of potential symbol positions within a subframe, and wherein the transceiver is configured to:

perform the PUSCH transmission from the starting position after detecting a channel on the unlicensed spectrum to be idle, such that the PUSCH transmission ends at the ending symbol indicated by the first information, the PUSCH transmission being performed within the ending symbol, wherein the ending symbol is used to determine a scaling factor associated with a number of available symbols, and to determine a transport block size based on the scaling factor, and wherein the transceiver is configured to notify the second information to the base station before performing the PUSCH transmission.

8. The UE of claim 7, wherein the n potential ending symbols further include the 14th symbol of the subframe.

* * * * *